(12) United States Patent
Javaid et al.

(10) Patent No.: US 11,354,609 B2
(45) Date of Patent: Jun. 7, 2022

(54) DYNAMIC PRIORITIZATION OF ACTION ITEMS

(71) Applicant: INTERNATIONAL BUSINESS MACHINES CORPORATION, Armonk, NY (US)

(72) Inventors: Azka Javaid, Brooklyn, NY (US); Paul R. Bastide, Ashland, MA (US); Jayanth Krishnan, Cambridge, MA (US); Fang Lu, Billerica, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 260 days.

(21) Appl. No.: 16/386,837

(22) Filed: Apr. 17, 2019

(65) Prior Publication Data

US 2020/0334614 A1 Oct. 22, 2020

(51) Int. Cl.
*G06Q 10/06* (2012.01)
*H04W 4/021* (2018.01)
(Continued)

(52) U.S. Cl.
CPC ..... *G06Q 10/063114* (2013.01); *G06N 20/00* (2019.01); *G06Q 10/06315* (2013.01);
(Continued)

(58) Field of Classification Search
None
See application file for complete search history.

(56) References Cited

U.S. PATENT DOCUMENTS 5,377,354 A * 12/1994 Scannell ............... H04L 51/22
706/45
6,192,360 B1 * 2/2001 Dumais ............... G06K 9/6269
(Continued)

FOREIGN PATENT DOCUMENTS

JP 2004506961 A * 3/2004

OTHER PUBLICATIONS

Guo, Michelle, et al. "Dynamic task prioritization for multitask learning." Proceedings of the European Conference on Computer Vision (ECCV). (Year: 2018).*
(Continued)

*Primary Examiner* — Shelby A Turner
(74) *Attorney, Agent, or Firm* — Cuenot, Forsythe & Kim, LLC (57) ABSTRACT

Dynamic prioritization of an action item can include retrieving an electronically rendered text from one or more sampled text sources in response to recognizing a user-related task conveyed within the electronically rendered text. Dynamic prioritization of an action item can also include generating an action item corresponding to the user-related task and prioritizing the action item by assigning to the action item a priority computed based on one or more priority factors corresponding to the user-related task. Each of the one or more priority factors can be automatically selected from a collection of predetermined priority factors. Additionally, dynamic prioritization of an action item can include recomputing the priority assigned to the action item in response to a change in task-related circumstances, as determined based on other electronically rendered text.

20 Claims, 6 Drawing Sheets

(51) Int. Cl.
*G06Q 10/10* (2012.01)
*G06N 20/00* (2019.01)

(52) U.S. Cl.
CPC ........... *G06Q 10/06316* (2013.01); *G06Q 10/063112* (2013.01); *G06Q 10/063116* (2013.01); *G06Q 10/109* (2013.01); *H04W 4/021* (2013.01)

(56) References Cited

U.S. PATENT DOCUMENTS

| | | | | |
|---|---|---|---|---|
| 6,708,202 | B1* | 3/2004 | Shuman | G06F 9/451 |
| | | | | 709/206 |
| 6,778,941 | B1* | 8/2004 | Worrell | G06Q 10/107 |
| | | | | 702/176 |
| 7,885,948 | B2* | 2/2011 | Johnson | H04L 51/12 |
| | | | | 707/705 |
| 8,024,415 | B2* | 9/2011 | Horvitz | H04L 51/12 |
| | | | | 709/207 |
| 8,381,088 | B2* | 2/2013 | Kikin-Gil | G06Q 10/109 |
| | | | | 715/205 |
| 9,170,993 | B2 | 10/2015 | Kalia et al. | |
| 9,400,963 | B1 | 7/2016 | Morlen | |
| 9,652,531 | B2* | 5/2017 | Buddenbaum | H04L 67/10 |
| 2004/0059622 | A1 | 3/2004 | Mueller | |
| 2005/0165631 | A1* | 7/2005 | Horvitz | G06Q 10/06314 |
| | | | | 705/7.16 |
| 2006/0224965 | A1* | 10/2006 | Bodin | G06Q 10/10 |
| | | | | 715/730 |
| 2012/0245925 | A1* | 9/2012 | Guha | G06F 40/237 |
| | | | | 704/9 |
| 2012/0290288 | A1* | 11/2012 | Ait-Mokhtar | G06F 40/211 |
| | | | | 704/9 |
| 2013/0124605 | A1* | 5/2013 | Klaka | G06Q 10/10 |
| | | | | 709/203 |
| 2014/0200949 | A1 | 7/2014 | Perry et al. | |
| 2015/0154528 | A1 | 6/2015 | Kharraz Tavakol | |
| 2015/0363733 | A1* | 12/2015 | Brown | G06Q 10/10 |
| | | | | 705/7.26 |
| 2016/0086116 | A1* | 3/2016 | Rao | G06F 3/0481 |
| | | | | 705/7.21 |
| 2016/0148170 | A1* | 5/2016 | Fitzpatrick | H04W 4/029 |
| | | | | 705/7.21 |
| 2016/0224946 | A1* | 8/2016 | Vemuri | G06Q 10/1097 |
| 2016/0358065 | A1* | 12/2016 | Gedge | G06N 7/00 |
| 2017/0193349 | A1* | 7/2017 | Jothilingam | G06Q 10/06 |
| 2017/0200093 | A1* | 7/2017 | Motahari Nezhad | G06F 40/30 |
| 2017/0344931 | A1* | 11/2017 | Shenk | G06Q 10/063116 |
| 2018/0176170 | A1 | 6/2018 | Kursun et al. | |
| 2019/0213245 | A1* | 7/2019 | Oxstrand | G06F 40/151 |
| 2020/0097303 | A1* | 3/2020 | O'Kane | G06Q 10/109 |
| 2020/0210965 | A1* | 7/2020 | Garber | G06Q 10/06315 |
| 2020/0226216 | A1* | 7/2020 | Marin | G06F 16/345 |
| 2020/0258013 | A1* | 8/2020 | Monnett | H04L 41/5074 |
| 2020/0311543 | A1* | 10/2020 | Jamali | G06N 3/08 |

OTHER PUBLICATIONS

Mell, P. et al., The NIST Definition of Cloud Computing, National Institute of Standards and Technology, U.S. Dept of Commerce, Special Publication 800-145, Sep. 2011, 7 pg.

Roberts, M., "Managing Parallel Development with Rational Team Concernt," [online] IBM Corporation, Developer Works, Aug. 30, 2011, retrieved from the Internet: <https://www.ibm.com/developerworks/rational/library/parallel-development-rational-team-concert/index.html>, 29 pg.

* cited by examiner

DYNAMIC PRIORITIZATION OF ACTION ITEMS

BACKGROUND

The present disclosure relates to the field of data processing, and more particularly, to systems and methods for processing data pertaining to the performance of tasks and activities.

Devices such as computers, smartphones, and other such devices endowed with data processing capabilities are often used for calendaring task and activities. For example, software tools that run on such devices can provide device users with the ability to manage their schedule by defining, categorizing, organizing and tracking tasks and activities. The software may be a local application configured for use by an individual or may be part of a network tool for sharing information among multiple users.

SUMMARY

A method can include retrieving, with a computer, an electronically rendered text from one or more sampled text sources in response to automatically recognizing a user-related task conveyed within the electronically rendered text. The method also can include generating an action item corresponding to the user-related task. Additionally, the method can include prioritizing the action item by assigning to the action item a priority computed based on at least one priority factor corresponding to the user-related task. The at least one priority factor can be automatically selected from a collection of predetermined priority factors. The method also can include responding to a change in task-related circumstances, as determined from other electronically rendered text, by recomputing the priority assigned to the action item.

A system includes a computer having at least one processor programmed to initiate executable operations. The executable operations can include retrieving an electronically rendered text from one or more sampled text sources in response to automatically recognizing a user-related task conveyed within the electronically rendered text. The executable operations also can include generating an action item corresponding to the user-related task. Additionally, the executable operations can include prioritizing the action item by assigning to the action item a priority computed based on at least one priority factor corresponding to the user-related task. The at least one priority factor can be automatically selected from a collection of predetermined priority factors. The executable operations also can include recomputing the priority assigned to the action item in response to a change in task-related circumstances, as determined from other electronically rendered text.

A computer program product includes a computer-readable storage medium in which is stored program code, the program code executable by computer hardware to initiate operations. The operations can include retrieving an electronically rendered text from one or more sampled text sources in response to automatically recognizing a user-related task conveyed within the electronically rendered text. The operations also can include generating an action item corresponding to the user-related task. Additionally, the operations can include prioritizing the action item by assigning to the action item a priority computed based on at least one priority factor corresponding to the user-related task. The at least one priority factor can be automatically selected from a collection of predetermined priority factors. The operations also can include recomputing the priority assigned to the action item in response to a change in task-related circumstances, as determined from other electronically rendered text.

DETAILED DESCRIPTION

A calendaring system that presents only a static snapshot of action items corresponding to a user's work or scheduled activities fails to capture dynamic changes that often occur before the user can act on the calendared action items. The systems, methods, and computer program products disclosed herein capture and act on such changes. The systems, methods, and computer program products disclosed herein dynamically re-prioritize and re-sort previously prioritized action items in response to changing circumstances, whose indicia are automatically recognized within electronically rendered texts conveyed over various communication and data networks.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
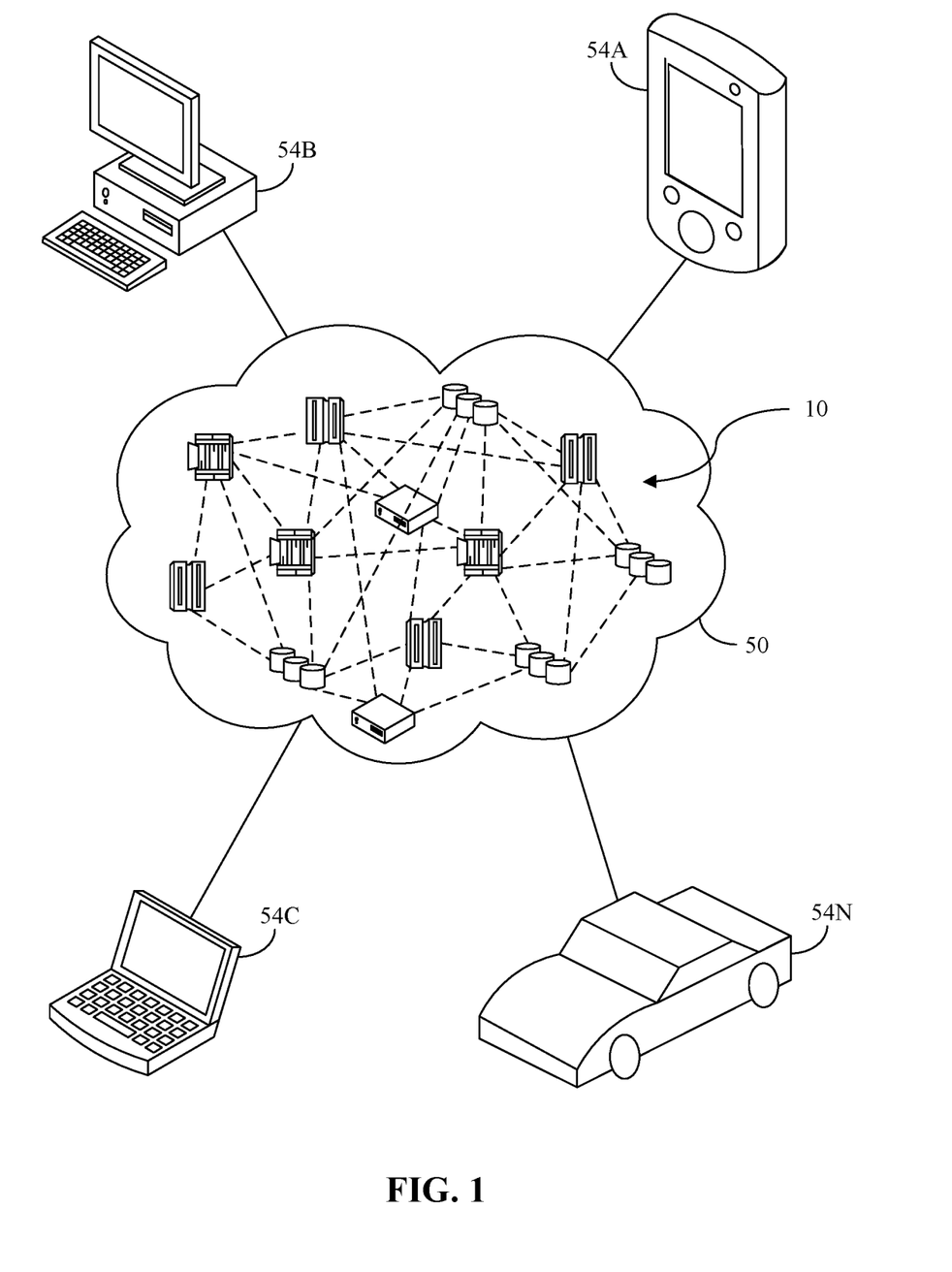
FIG. 1 depicts a cloud computing environment according to an embodiment of the present invention.

Referring now to FIG. 1, illustrative cloud computing environment 50 is depicted. As shown, cloud computing environment 50 includes one or more cloud-based computing nodes 10 with which local computing devices used by cloud consumers, such as, for example, personal digital assistant (PDA) or cellular telephone 54A, desktop computer 54B, laptop computer 54C, and/or automobile computer system 54N may communicate. Computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
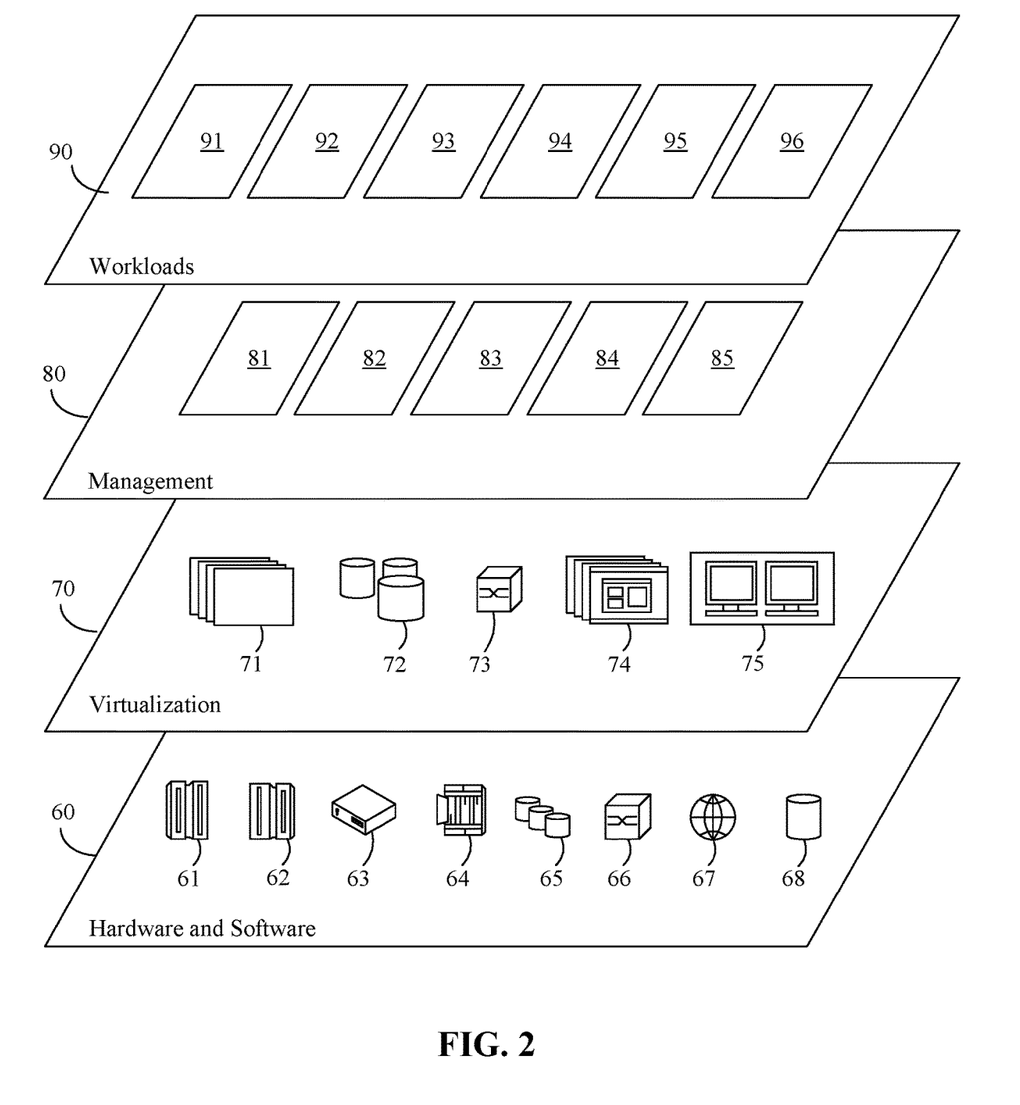
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic action item prioritization 96.

A system for dynamic action item prioritization 96 can be communicatively coupled to one or more sources of text. A text source can be, for example, an email system, messaging system, enterprise collaboration system, social network, or any other communication or data network in which electronically rendered text (or messages) are conveyed, and from which text-based data can be pulled. The system can retrieve an electronically rendered text from one or more such text sources. The system can retrieve the text in response to recognizing that a user-related task is conveyed within the electronically rendered text. Natural language processing can be used by the system to recognize a user-related task. The system can generate an action item corresponding to the task conveyed within the electronically rendered text and can prioritize the action item by assigning a priority to the action item. As defined herein, an "action item" is a system-generated representation of a task derived using natural language processing from the natural language expressed in an electronically rendered text.

An action item priority is computed by the system for dynamic action item prioritization 96 based on one or more priority factors. A priority factor can be, for example, a system-recognized sentiment expressed in the electronically rendered text from which the prioritized action item is derived. Another priority factor, for example, can be an interest of a user, inferred by the system from various text drawn from text sources such as a social network. Still another priority factor can be, for example, a relationship between the system user and the person for whom the task corresponding to a prioritized action item is performed.

The system for dynamic action item prioritization 96 uses machine learning (e.g., deep neural network learning, Bayesian learning, regression analysis) to learn a model that determines priorities based on weighting multiple priority factors. An action item priority can correspond to the likelihood that a system user will act on, or with respect to, the action item within a specific timeframe.

The system for dynamic action item prioritization 96 can rank or order multiple action items (e.g., as a list ordered with a ranking metric) based on the respective priorities of each action item. The system can determine an expiry time for completing or acting on each prioritized action item.

The system for dynamic action item prioritization 96 deals with the dynamic nature of events, conditions, and situations that affect the priorities of pending action items. Specifically, the system re-prioritizes action items in response to changes in task-related circumstances relevant to specific action items. As defined herein, a "task-related circumstance" is any event, condition, or situation that is recognized in the natural language of an electronically rendered text using natural language processing and that affects the priority and/or expiry time of an action item. Accordingly, a "change in circumstance" as defined herein is any event, condition or situation that occurs subsequent to the system generating a priority and/or expiry time of an action item and that prompts the system to revise the priority and/or expiry time.

Moreover, the system for dynamic action item prioritization 96 deals with the inherent interdependencies of action items. As the system prioritizes one action or re-prioritizes a pending action item in response to a change in circumstances, so too, the system re-prioritizes all other pending action items that are affected as well. Action item expiry times can also be affected by changes in circumstances. Accordingly, the system also can revise expiry times in response to changes in circumstances.

The system for dynamic action item prioritization 96 can be implemented as computer code, circuitry, or a combination of code and circuitry. The system can operate in conjunction with or in lieu of a calendaring system. The system can run on a computer, laptop, tablet, smartphone, or other communication or data processing device. In one embodiment, the system can be provided as a service using a networked server (e.g., cloud-based server) accessible by users over a communications network (e.g., Internet, LAN, wLAN).

Figure 3:
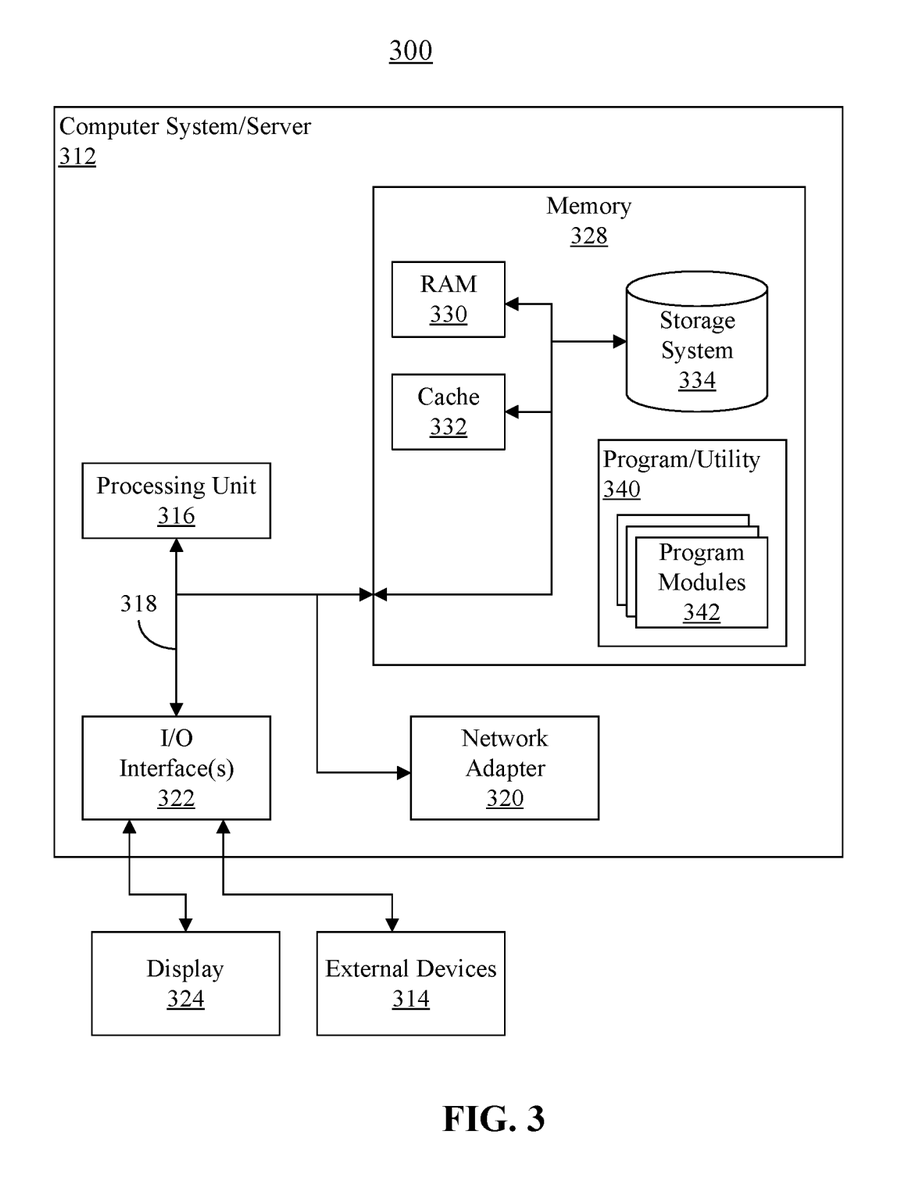
FIG. 3 depicts a cloud computing node according to an embodiment of the present invention.

Referring now to FIG. 3, a schematic of an example of a cloud computing node is shown. Computing node 300 is only one example of a suitable cloud computing node and is not intended to suggest any limitation as to the scope of use or functionality of embodiments described herein. Regardless, computing node 300 is capable of being implemented and/or performing any of the functionality set forth hereinabove.

Computing node 300 includes a computer 312, which is operational with numerous other general-purpose or special-purpose computing system environments or configurations. Examples of well-known computing systems, environments, and/or configurations that may be suitable for use with computer 312 include, but are not limited to, personal computers, servers, thin clients, thick clients, hand-held or laptop devices, multiprocessor systems, microprocessor-based systems, set top boxes, programmable consumer electronics, network PCs, minicomputers, mainframe computers, and distributed cloud computing environments that include any of the above systems or devices, and the like.

Computer 312 may be described in the general context of computer system-executable instructions, such as program modules, being executed by a computer or computing system. Generally, program modules may include routines, programs, objects, components, logic, data structures, and so on that perform particular tasks or implement particular abstract data types. Computer 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer 312 in computing node 300 is shown in the form of a general-purpose computing device. The components of computer 312 may include, but are not limited to, one or more processors 316, a memory 328, and a bus 318 that couples various system components including memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 312 typically includes a variety of computer-readable media. Such media may be any available media that is accessible by computer 312, and includes both volatile and non-volatile media, removable and non-removable media.

Memory 328 can include computer-readable media in the form of volatile memory, such as random-access memory (RAM) 330 and/or cache memory 332. Computer 312 may further include other removable/non-removable, volatile/non-volatile computer storage media. By way of example, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the described.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments described herein.

For example, one or more of the program modules may include the system for implementing dynamic action item prioritization 96 or portions thereof. Program/utility 340 is executable by processor 316. Program/utility 340 and any data items used, generated, and/or operated upon by computing node 300 are functional data structures that impart functionality when employed by node 300. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer 312 may also communicate with one or more external devices 314 such as a keyboard, a pointing device, a display 324, etc.; one or more devices that enable a user to interact with computer 312; and/or any devices (e.g., network card, modem, etc.) that enable computer 312 to communicate with one or more other computing devices. Such communication can occur via Input/Output (I/O) interfaces 322. Computer 312 can communicate with one or more networks such as a local area network (LAN), a general wide area network (WAN), and/or a public network (e.g., the Internet) via network adapter 320. As depicted, network adapter 320 communicates with the other components of computer 312 via bus 318. It should be understood that although not shown, other hardware and/or software components could be used in conjunction with computer 312. Examples include, but are not limited to, the following: microcode, device drivers, redundant processing units, external disk drive arrays, RAID systems, tape drives, and data archival storage systems.

While computing node 300 is used to illustrate an example of a cloud computing node, it should be appreciated that a computer system using an architecture the same as or similar to that shown in FIG. 3 may be used in a non-cloud computing implementation to perform the various operations described herein. In this regard, the example embodiments described herein are not intended to be limited to a cloud computing environment.

Figure 4:
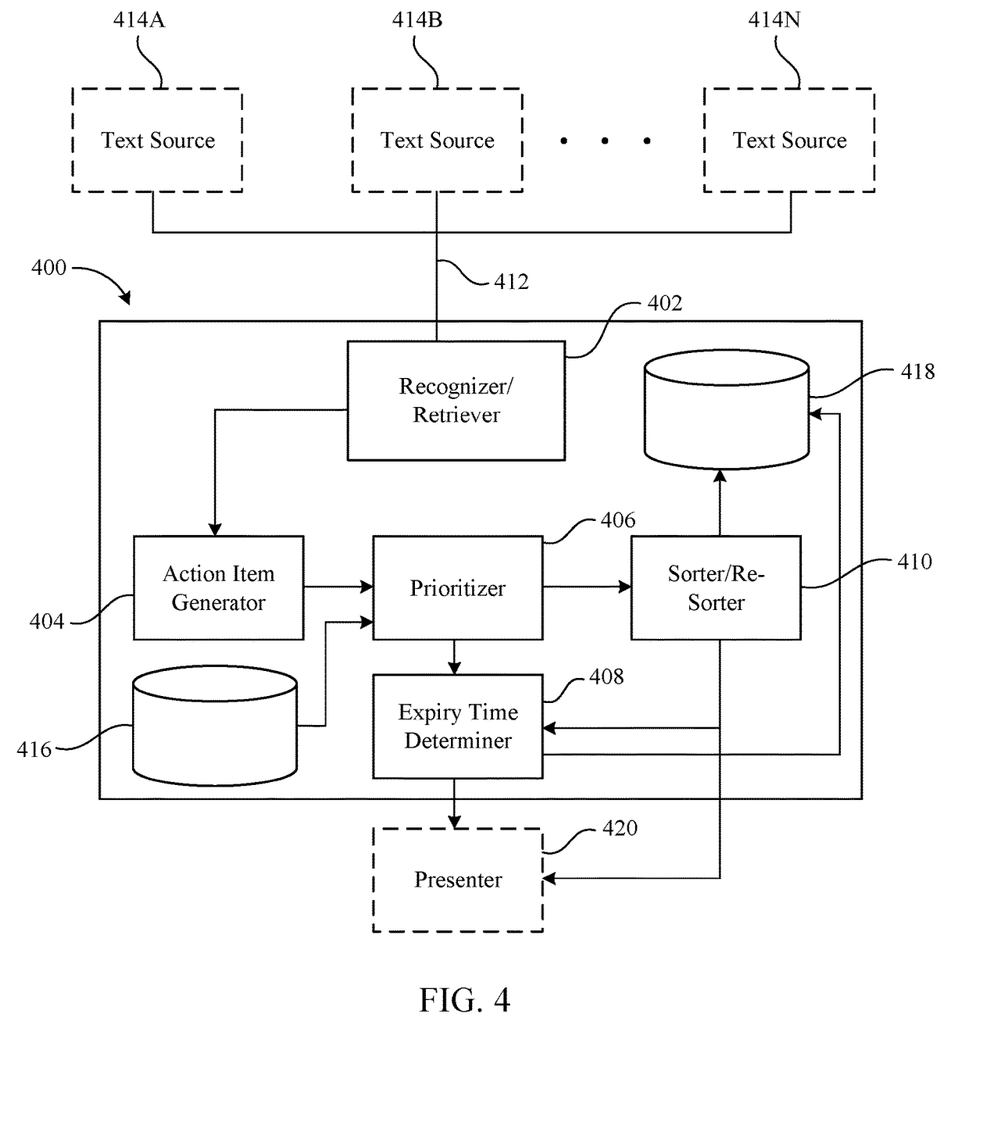
FIG. 4 depicts a system according to an embodiment of the present invention.

Referring now to FIG. 4, system 400 illustrates one embodiment of a system such as the system for dynamic action item prioritization 96 described with reference to FIG. 2. System 400 illustratively includes recognizer/retriever 402, action item generator 404, prioritizer 406, expiry time determiner 408, and sorter/re-sorter 410, each of which can be implemented in processor-executable computer code (e.g., program modules) executable by a processor such as processor 316 of computer 312 described with reference to FIG. 3. The computer code can be electronically stored in a memory such as memory 328 and conveyed to the processor via a bus such as bus 318 as also described with reference to FIG. 3.

In other embodiments, the computer code can execute on a smartphone or other communication device having data processing and storage capabilities. In yet another embodiment, system 400 can be implemented as a service that executes on a server (e.g., cloud-based server) that a user accesses using another device (e.g., computer, laptop, tablet, smartphone). In various embodiments, one or more of recognizer/retriever 402, action item generator 404, prioritizer 406, expiry time determiner 408, and sorter/re-sorter 410 can be implemented in hardwired electronic circuitry or a combination of circuitry and computer code. System 400 can operate in conjunction with or in lieu of a conventional electronic calendaring system. Additionally, or alternatively, system 400 can operate in conjunction with or be integrated in a messaging system and/or collaboration system.

Illustratively, system 400 is communicatively coupled via data communications channel 412 to multiple text sources 414A, 414B, 414N. A text source can be a communication system (e.g., email, instant messaging system, collaboration system, web conferencing system, or the like) or network (e.g., social network) from which system 400 can pull textual data. In one embodiment, a text source can be a telephonic or voice messaging system, and system 400 can be endowed with a voice-recognition capability (not explicitly shown) to convert voice messages to text. Although only three such text sources are shown, it is expressly noted that system 400 can be communicatively coupled to any number of communication and/or data systems or networks via the same or separate communication channels.

Recognizer/retriever 402 samples various texts comprising messages, social feeds, calendared events and other data electronically rendered as text on one or more communication and/or data systems or networks to which system 400 is communicatively coupled. In recognizing and retrieving relevant text, recognizer/retriever 402 can use any of various natural language processing (NLP) techniques. NLP techniques, generally, facilitate interactions between computer systems and natural (human) languages thereby enabling computer systems to derive computer-understandable meaning from natural language input. The International Organization for Standardization (ISO), for example, publishes standards for NLP, one such standard being ISO/TC37/SC4.

Using any of the various NLP techniques, recognizer/retriever 402 can parse and derive patterns within the retrieved text in order to identify words, expression, phrases and/or other linguistic features within electronically rendered text. Recognizer/retriever 402 can perform various NLP tasks, such as categorization, clustering, concept extraction, sentiment analysis, and the like to derive various forms of informative content from the electronically rendered text. Specifically, recognizer/retriever 402 recognizes a user-related task within an electronically rendered text and retrieves the text from a sampled text source.

Based on recognition within the text of a specific user-related task, action item generator 404 generates an action item corresponding to the task. The action item, as defined herein, is a system-generated representation of the task derived using natural language processing from the natural language expressed in the electronically rendered text retrieved by recognizer/retriever 402.

Prioritizer 406 prioritizes the action by assigning to the action item a priority that is computed based one or more priority factors. System 400 illustratively includes database 416 comprising a collection of predetermined priority factors, one or more of which are automatically selected by prioritizer 406 in computing the priority to be assigned to an action item.

In one embodiment, a priority assigned to an action item by prioritizer 406 is a probability computed based on a weighting of one or more priority factors recognized within the electronically rendered text from which the action item is derived. The probability computed by prioritizer 406 can correspond to the likelihood that the user will act on the action item within a specific timeframe. System 400 can be configured to enable the user to specify a timeframe (e.g., daily, weekly, monthly) and to vary it to as the demands of the user change. In one embodiment, system 400 can automatically vary the timeframe according to a user's current focus, determination of which is described more fully below.

System 400 uses machine learning (e.g., deep neural network learning, Bayesian learning, regression analysis) to determine the weights used for weighting the priority factors that are the basis of priorities computed by prioritizer 406. For example, using a regression learning algorithm, system 400 generates a function $f: \mathbb{R}^n \to \mathbb{R}$ that, through machine learning on a collection of correctly labeled examples, can take an unlabeled example as input and output a predicted or probabilistic value. Each labeled example (training input) can be configured as an n-gram or n-tuple (feature vector), x, wherein each element corresponds to the number of times that a keyword from a predetermined vocabulary appears in a natural language description of an action item or task-related circumstance. The function $f$ uses an n-element weight vector, w, to compute a numerical value y, between zero and one, where $y=f(x)=w \cdot x=w^T x$. The weight vector, w, can initially be assigned random values that are then iteratively adjusted using machine learning until the correctly labeled examples are predicted by function $f$ with an acceptable level of accuracy. In other embodiments, system 400 can use other machine learning algorithms or techniques for creating a model to generate action item priorities.

Based on a computed priority and, if applicable, any explicit due date associated with the task from which an action item is generated, expiry time determiner 408 determines an expiry time for the user to complete the action item and links the expiry time to the action item. Although priority and expiry time are related, each is treated by system 400 as a conceptually distinct element. As multiple action items are generated and prioritized, sorter/re-sorter 410 sorts the set of action items (e.g., generating a ranked listing) based on the priority assigned and expiry time linked to each action item. Prioritized action items and expiry times of each can be electronically stored in database 418. Periodically, or in response to a user request, system 400 can present a sorted collection of prioritized action items to the user with presenter 420. Presenter 420 can be a component of a device with which the user accesses system 400 (e.g., using a screen display of a computer or smartphone).

System 400 takes into account the inherently dynamic nature of events, conditions, and situations that affect action item priorities and that may arise subsequent to determination of the original priorities by prioritizer 406. The arrival of a new action item whose priority is higher than that of at least some existing action items prompts a re-prioritization of the existing action items by prioritizer 406. Completion of one action item likewise prompts prioritizer 406 to re-prioritize the remaining action items. Both events can prompt a corresponding change in expiry times by expiry time determiner 408 and re-sorting of a sorted collection of action items by sorter/re-sorter 410.

Other events, conditions, and situations that affect action item priorities, however, do not correspond to the arrival of a new action item or the completion of an old action item. Thus, as these other events, conditions, and situations that affect action item priorities change, system 400 automatically changes system-generated priorities accordingly.

Recognizer/retriever 402 in sampling text sources 414A-414N and pulling data in electronically rendered text from the sources can recognize task-related changes that affect already-prioritized action items electronically stored in database 418. For example, an electronically rendered text may indicate cancellation of a planned event, prompting action item generator 404 to remove the corresponding action item from the system. Or, for example, an electronically rendered text may indicate the occurrence of an impediment that, until resolved, will delay a scheduled project's commencement, prompting prioritizer 406 to re-assign a now-lower priority to the corresponding action item. Another electronically rendered text may indicate, for example, an increased urgency for completing a report, prompting prioritizer 406 to re-assign a now-higher priority to the corresponding action item. These are but some examples of the events, conditions, or situations recognizable by recognizer/retriever 402 from words, phrases or expressions in electronically rendered text relating to an underlying task corresponding to an electronically stored action item. The recognition and retrieval of the text prompts prioritizer 406 to re-prioritize the affected action. A re-prioritization of one action item, moreover, prompts the system to revise, as necessary, the priorities of each other previously prioritized action item that is affected by re-prioritization of the action directly affected by the changed circumstances.

Because the priority assigned to each action item can correspond to the likelihood that the user will act on the action item within a specified timeframe, that probability also changes as circumstances change. Expiry times of each action item are likewise revised by expiry time determiner 408. In an embodiment in which prioritized action items are presented as a sorted list, sorter/re-sorter 410 also resorts the list in response to a change in task-related circumstances.

System 400 though machine learning described above can learn to compute action item priorities based on a wide variety of priority factors corresponding to user-related tasks. Priority factors can include the importance of an action item corresponding to a user-related task based on the importance of the user-related task to a party for whom the user-related task is performed. (e.g., someone for whom the user will perform the task). For example, system 400 can respond to electronically rendered text regarding a task requested by a user's client or manager by consistently generating action items that are assigned the highest priority by prioritizer 406.

Priority factors can include topics or concepts that based on the user's prior interactions (e.g., on a social network) the system determines is of particular interest to the user. For example, based on electronically rendered text on a social network, system 400 may determine that the user is a food connoisseur who places a high priority on dinning, prompting prioritizer 406 to assign high priorities to action items such as planning a dinner engagement or accepting a dinner invitation.

Priority factors can include the user's current focus of activity as reflected in a text (e.g., email, text message, collaboration system conversation) detected by the system. Prioritizer 406 elevates the priority of all action items related to the user's current focus, reflecting a higher probability that the user will act on the newly re-prioritized action items. For example, the user may post a message, send an email, or otherwise engage in an exchange of electronically rendered texts regarding a particular project, prompting prioritizer 406 to re-prioritize all action items related to the project. The expiry time linked to each of the action items can also be reset by expiry time determiner 408, reflecting a now-greater likelihood that the user will act on the action items. The change in task-related circumstances also prompts a redetermination of priorities by prioritizer 406 and a resetting of expiry times by expiry time determiner 408 of all action items not-related to the project as well.

A sentiment expressed in electronically rendered text can be a priority factor. For example, an electronically rendered text (e.g., an email, social feed, or instant message) that contains a word or phrase recognizable as indicating urgency (e.g., "urgent" or "I need the cost estimate ASAP") can be factor that prompts prioritizer 406 to assign a relatively higher priority to an action item derived from such a text. Other sentiments expressed in an electronically rendered text can likewise indicate urgency, or in some cases, a lack of urgency (e.g., "send the cost estimates whenever you have a chance"). Words, expressions, or phrases indicating various other sentiments can likewise be recognized as factors for determining priority. Sentiment also can indicate a change in circumstances prompting the system to recompute an earlier-determined priority or reset an expiry time. A text stating, for example, "I am frustrated by not having yet received your report" could prompt prioritizer 406 to increase a priority assigned to a report-writing action item and/or expiry time determiner 408 to move up an earlier-set expiry time for the action item.

The number of parties relying on the user to complete an action item as determined by electronically rendered text related to the action item can be another priority factor. Interdependent relationships specified within an organizational hierarchy or specified by the user and referenced in a text from which an action item is derived can also be priority factors. Terms specifying specific dates and/or times can also be priority factors. A task that is but one of a sequence of tasks (e.g., co-dependent tasks conveyed as series of bullet points in a text) required for completing a multi-task project can likewise be a priority factor used by prioritizer 406 in assigning a priority to the corresponding action item.

A historical pattern of the frequency with which the same particular action item is repeated can be a priority factor. For example, if a pattern shows that a user calendars the same action item periodically and consistently completes the action item within approximately the same time interval, the interval can be used by prioritizer 406 for generating a priority for the action item as well as by expiry time determiner 408 for determining an expiry time for the action item. Relatedly, the resolution time for the same or similar action items previously undertaken can be a priority factor. If a date certain is set for completing the action item, prioritizer 406 can generate a priority that reflects the amount of time the user has typically taken to resolve or complete the action item in the past and how near that date certain is. Skill level and/or experience with a topic associated with an action item can also be a priority factor. An action item that relates to a topic with which the user has an identifiable level of skill or experience—suggesting that the user will or will not take an inordinate amount of time to "get up to speed" on the action item—can be a priority factor used by prioritizer 406 in prioritizing the action item.

With system 400, generally, given other action items pending for a user to complete, the expiry time can be shorter for those action items having higher priority. If, however, an electronically rendered text indicates a specific time as a hard deadline, then the specific time overrides any other priority factor. Thus, an action item whose importance otherwise warrants a high priority may be currently assigned a less imminent priority and correspondingly longer expiry time if the specific time (hard deadline) is well in the future. Nonetheless, as described above, priorities and/or expiry times can change as circumstances change. One such change is the drawing nearer of a hard deadline. The priority of a relatively important action item typically increases with time as the expiry time draws near. The priority of an otherwise relatively unimportant action item may not increase by much, or at all, as the action item's expiry time draws near.

In one embodiment, the priority of an action item can be re-prioritized by prioritizer 406 based on how long the action item has not been acted upon by the user. For example, in a specific embodiment, if the expiry time linked to action item has passed a predetermined number of times, the action item generator 404 can eliminate the action or prioritizer 406 can re-prioritize the action item by re-assigning a lower priority to the action item, again demonstrating that priority and expiry time need not be perfectly correlated.

In another embodiment, system 400 incorporates a location awareness component that enables a user to create a virtual perimeter, or geo-fence, at selected locations (e.g., office building, train station, park). In response to the user entering a geo-fenced area with a location-aware device that incorporates or remotely accesses system 400, prioritizer 406 automatically monitors for changes that have occurred in task-related circumstances and recomputes priorities assigned to action items in response to any changes. For example, if the user establishes a geo-fence about the user's office, system 400 can update priorities whenever the user enters the office location. Additionally, or alternatively, system 400 can determine the current focus of the user by identifying a geographical location of the user. For example, if the user is unable to make calls during train travel to or from the user's office, prioritizer 406 can re-prioritize action items when the user enters the train station so that action items that can be done without having to make any calls are given a higher priority than are other action items. Expiry time determiner 408 also can be triggered to re-compute one or more expiry times based on system 400 identifying a specific location of the user with the location awareness component.

Figure 5:
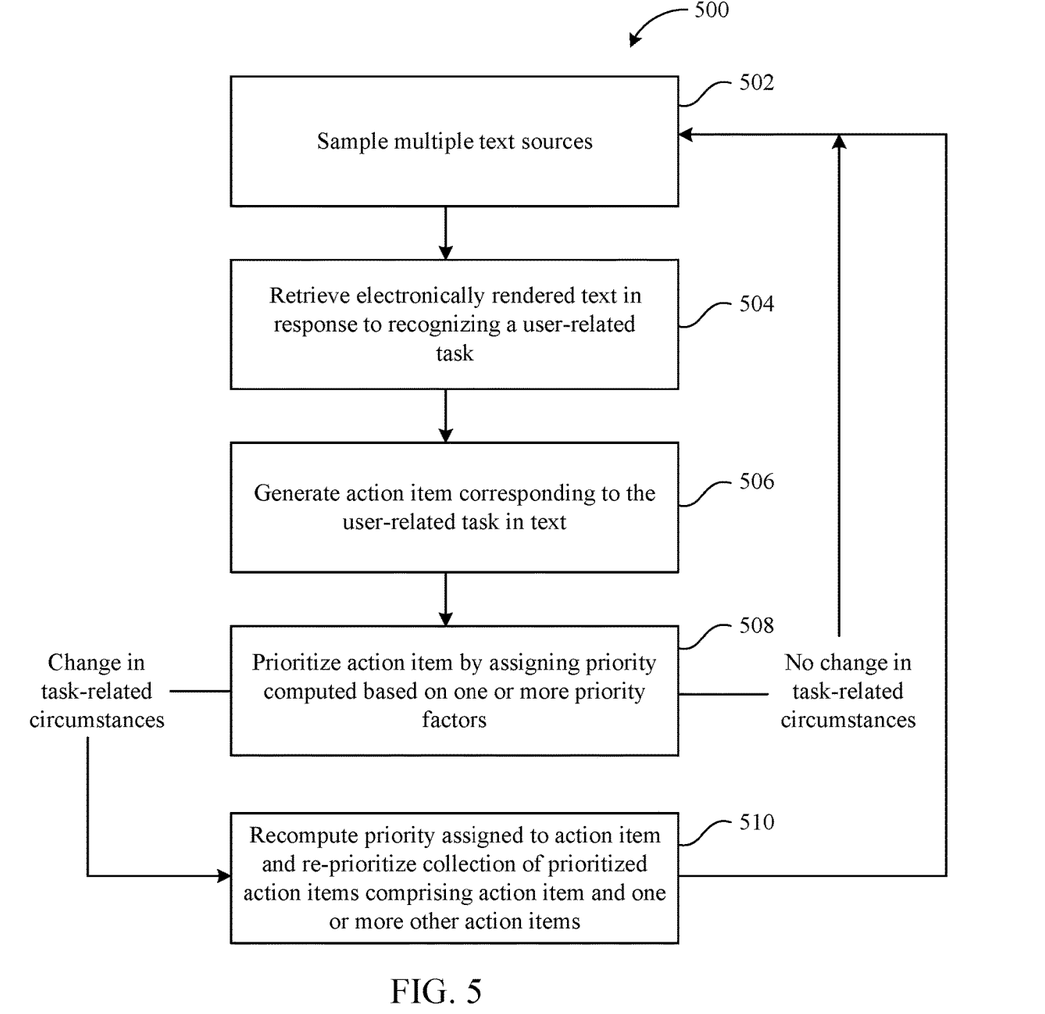
FIG. 5 is a flowchart of a method according to one embodiment of the present invention.

FIG. 5 is a flowchart of method 500 of dynamically prioritizing action items according to one embodiment. Method 500 can be performed by a system the same as or similar to the systems described in reference to FIGS. 1-4. The method can begin with the system sampling one or more text sources at 502. At 504, the system retrieves an electronically rendered text from one or more of the sampled text sources in response to recognizing a user-related task conveyed within the electronically rendered text. The system generates an action item corresponding to the user-related task at 506 and prioritizes the action item at 508. The system prioritizes the action item by assigning to the action item a priority computed based on one or more priority factors that correspond to the user-related task. The one or more priority factors can be automatically selected by the system from a database of predetermined priority factors.

The system continues monitoring the one or more text sources to determine whether and when any change in task-related circumstances pertaining to the prioritized action item occurs. If no change in task-related circumstances occurs, the system continues sampling one or more text sources at 502. Whenever a change in task-related circumstances occurs, as determined by the system based on other electronically rendered text retrieved from the one or more sampled text sources, the system responds at 510. The system responds at 510 by recomputing the priority assigned to the action item. Additionally, at 510 the system re-prioritizes a collection of prioritized action items that includes the action item. The collection includes all other prioritized action items whose priorities are affected by the re-prioritizing of the action item and that are re-prioritized accordingly. After re-prioritizing action items affected, the system can resume sampling the one or more text sources at 502.

Additionally, the system can optionally determine an expiry time for completion of an action item and link the expiry time to the action item. The expiry time can be based, at least in part, on the priority assigned to the action item. The system optionally can change the expiry time in response to any change in task-related circumstances.

In one embodiment, the prioritizing at 508 and the re-prioritizing at 510 correspond to determining a probability indicating the likelihood that a user will act upon the action item within a specified timeframe. In another embodiment, the prioritizing at 508 is computed, at least in part, based on an importance of the action item corresponding to the user-related task as determined by the importance of the user-related task to a party for whom the user-related task is performed.

In another embodiment, the prioritizing at 508 and the re-prioritizing at 510 is based in whole or in part on a current focus of the user. For example, multiple action items can share a common topic, similar theme, or other logical connection. Accordingly, the prioritizing at 508 or re-prioritizing at 510 can assign the same or a similar priority to each of the action items identified with reference to the user's current focus. Additionally, or alternatively, the prioritizing can be coupled with setting a specified timeframe for completing the action items determined to be mutually related based upon the current focus of the user.

In still another embodiment, while the system can prioritize based on at least one current focus of the user, the system also can recognize that a user is currently overlapping by focusing contemporaneously on activities pertaining to multiple topics. The system can respond by grouping the multiple topics according to the user's current foci and by prioritizing each action within one of the topical groups.

The priorities computed for action items with method 500 can be based on a task frequency. The task frequency can correspond to how often the corresponding action item has been performed in the past by a user and how long the user took to complete the action item. An action item priority also can be computed based on a task urgency, as reflected in language in an electronically rendered text. An action item priority also can be computed based on a task duration, or equivalently, the resolution time to complete the corresponding action item, based on an expected time interval between the start and completion of the action item, which the system either estimates or determines based on past historical patterns. An action item priority can also be computed based on the number of people assigned to a task, again, as reflected in an exchange of electronically rendered text. The number can be determined, for example, based on the number of different individuals mentioned in the electronically rendered text, identified as participating in a conversation, and/or addressed as a message recipient in one or more messages. An action item priority also can be based a task-specific skill level or experience of a user, the skill and/or experience being used by the system to estimate how long a user may take in completing the action item. An action item priority also can be computed based on a relationship between the user and the person for whom the action item is performed, reflected for example by the person's and the user's position in an organizational hierarchy.

Figure 6:
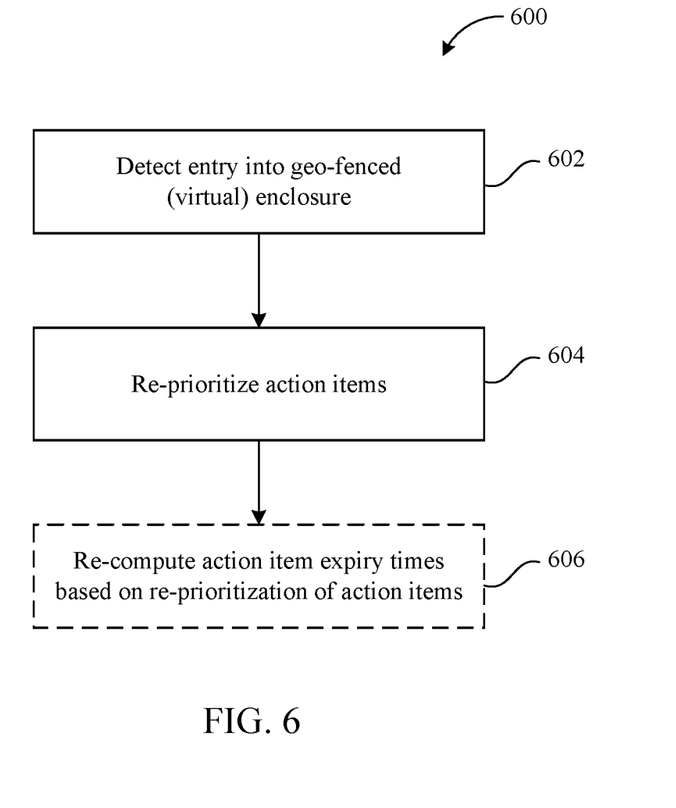
FIG. 6 is a flowchart of a method according to one embodiment of the present invention.

FIG. 6 is a flowchart of method 600 of dynamically prioritizing action items according to another embodiment. Method 600 can be performed by a system the same as or similar to the systems described in reference to FIGS. 1-4. The system incorporates a location awareness component that enables a user to create a virtual perimeter, or geo-fence, at selected locations (e.g., office building, train station, park). At 602 the system detects the user entering an area enclosed by the geo-fence and responds at 604 by re-prioritizing a collection of prioritized action items (e.g., responding to the user entering the office building by identifying newly arrived action items and re-prioritizing all action items, or by prioritizing action items that user can effectively focus on while traveling by train after entering a train station). Optionally, the system can recompute expiry times for the action items based on the re-prioritization and can link the recomputed expiry times to the respective action items. Optionally, in another embodiment, the system can determine a focus, or foci, of the user upon detecting the user crossing the virtual boundaries of the geo-fence. Accordingly, the system can re-prioritize action items and/or recompute expiry times of action items based upon the user's current focus or foci.

The described methods can be implemented as a computer program product at any possible technical detail level of integration. The computer program product can include a computer readable storage medium (or media) having computer readable program code stored therein, the program code executable by computer hardware to initiate operations including those described herein.

The computer readable storage medium can be a tangible device that can retain and store instructions for use by an instruction execution device. The computer readable storage medium can be, for example, an electronic storage device, a magnetic storage device, an optical storage device, an electromagnetic storage device, a semiconductor storage device, or any suitable combination thereof. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations described herein can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform the operations described herein.

Certain embodiments described herein are described with reference to flowchart illustrations and/or block diagrams of methods, apparatus (systems), and computer program products. It is expressly noted and is to be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In certain other implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose, hardware-based systems that perform the specified functions or acts or carry out combinations of special purpose hardware and computer instructions.

FIGS. 1-6 are conceptual illustrations allowing for a full explanation of the embodiments described. Notably, the figures and examples above are not meant to limit the scope of the disclosure to a single embodiment, as other embodiments are possible by way of interchange of some or all of the described or illustrated elements. Moreover, where certain elements can be partially or fully implemented using known components, only those portions of such known components that are necessary for an understanding of the disclosure are described, and detailed descriptions of other portions of such known components are omitted so as not to obscure the described embodiments. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the disclosure encompasses present and future known equivalents to the known components referred to herein by way of illustration.

The descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

That which is claimed is:

1. A method, comprising:
retrieving, with a computer, an electronically rendered text from at least one sampled text source in response to the computer automatically recognizing a user-related task conveyed within the electronically rendered text;
generating, with the computer, an action item corresponding to the user-related task;
prioritizing, with the computer, the action item by assigning to the action item a priority computed based on at least one priority factor, recognized within the electronically rendered text, corresponding to the user-related task, the at least one priority factor automatically selected from a database of predetermined priority factors by the computer, the prioritizing the action item comprising:
recognizing, as the priority factor for prioritizing the action item, a co-dependency of the at least one user-related task based on recognizing a sequence of tasks conveyed within the electronically rendered text that are required for completing a multi-task project, the recognizing comprising parsing the electronically rendered text and identifying linguistic features of the electronically rendered text by deriving, using natural language processing, patterns within the electronically rendered text to identify the priority factor including the sequence of co-dependent tasks; and
determining weights for weighting the priority of the action item using machine learning, the weights determined by configuring labeled training input as an n-gram feature vector or an n-tuple feature vector, wherein each element of the feature vector corresponds to a number of times that a keyword in the labeled training input appears in a natural language description of an action item or task-related circumstance, and the machine learning adjusting the weights for the weighting the priority until the priority is determined with at least a threshold level of accuracy;
monitoring, by the computer, the at least one sampled text source for changes in task-related circumstances pertaining to the prioritized action item;
responsive to recognizing a change in task-related circumstances in other electronically rendered text based on the monitoring, as determined by the computer using natural language processing, recomputing the priority assigned to the action item; and
continuing monitoring and recomputing, by the computer, the priority of the action item to generate a dynamically ranked list of action items.

2. The method of claim 1, further comprising linking an expiry time to the action item based on the priority and, responsive to the change in task-related circumstances, changing the expiry time.

3. The method of claim 1, wherein the prioritizing comprises determining a probability indicating a likelihood that a user will act upon the action item within a specified timeframe.

4. The method of claim 1, wherein the prioritizing comprises determining an importance of the action item corresponding to the user-related task based on the importance of the user-related task to a party for whom the user-related task is performed.

5. The method of claim 1, wherein the prioritizing comprises determining at least one current focus of a user.

6. The method of claim 5, wherein the determining at least one current focus of the user comprises identifying a geographical location of the user.

7. The method of claim 1, wherein the database of predetermined priority factors comprises at least one parameter selected from a group consisting of a number of people assigned to a task, a task-specific skill level, and an organizational hierarchy.

8. A system, comprising:
a computer having at least one processor programmed to initiate executable operations, the executable operations including:
retrieving an electronically rendered text from at least one sampled text source in response to recognizing a user-related task conveyed within the electronically rendered text;
generating an action item corresponding to the user-related task;
prioritizing the action item by assigning to the action item a priority computed based on at least one priority factor, recognized within the electronically rendered text, corresponding to the user-related task, the at least one priority factor automatically selected from a database of predetermined priority factors, the prioritizing the action item comprising:
recognizing, as the priority factor for prioritizing the action item, a co-dependency of the at least one user-related task based on recognizing a sequence of tasks conveyed within the electronically rendered text that are required for completing a multi-task project, the recognizing comprising parsing the electronically rendered text and identifying linguistic features of the electronically rendered text by deriving, using natural language processing, patterns within the electronically rendered text to identify the priority factor including the sequence of co-dependent tasks; and
determining weights for weighting the priority of the action item using machine learning, the weights determined by configuring labeled training input as an n-gram feature vector or an n-tuple feature vector, wherein each element of the feature vector corresponds to a number of times that a keyword in the labeled training input appears in a natural language description of an action item or task-related circumstance, and the machine learning adjusting the weights for the weighting the priority until the priority is determined with at least a threshold level of accuracy;
monitoring the at least one sampled text source for changes in task-related circumstances pertaining to the prioritized action item;
responsive to recognizing a change in task-related circumstances in other electronically rendered text based on the monitoring, as determined by the computer using natural language processing, recomputing the priority assigned to the action item; and
continuing monitoring and recomputing the priority of the action item to generate a dynamically ranked list of action items.

9. The system of claim 8, wherein the executable operations further include linking an expiry time to the action item based on the priority and, responsive to the change in task-related circumstances, changing the expiry time.

10. The system of claim 8, wherein the prioritizing comprises determining a probability indicating a likelihood that a user will act upon the action item within a specified timeframe.

11. The system of claim 8, wherein the prioritizing comprises determining an importance of the action item corresponding to the user-related task based on the importance of the user-related task to a party for whom the user-related task is performed.

12. The system of claim 8, wherein the prioritizing comprises determining at least one current focus of a user.

13. The system of claim 12, wherein the determining at least one current focus of the user comprises identifying a geographical location of the user.

14. A computer program product, comprising:
a computer-readable storage medium having program code stored thereon, the program code executable by computer hardware to initiate operations including:
retrieving an electronically rendered text from at least one sampled text source in response to automatically recognizing a user-related task conveyed within the electronically rendered text;
generating an action item corresponding to the user-related task;
prioritizing the action item by assigning to the action item a priority computed based on at least one priority factor corresponding to the user-related task, the at least one priority factor automatically selected from a database of predetermined priority factors, the prioritizing the action item comprising:
recognizing, as the priority factor for prioritizing the action item, a co-dependency of the at least one user-related task based on recognizing a sequence of tasks conveyed within the electronically rendered text that are required for completing a multi-task project, the recognizing comprising parsing the electronically rendered text and identifying linguistic features of the electronically rendered text by deriving, using natural language processing, patterns within the electronically rendered text to identify the priority factor including the sequence of co-dependent tasks; and
determining weights for weighting the priority of the action item using machine learning, the weights determined by configuring labeled training input as an n-gram feature vector or an n-tuple feature vector, wherein each element of the feature vector corresponds to a number of times that a keyword in the labeled training input appears in a natural language description of an action item or task-related circumstance, and the machine learning adjusting the weights for the weighting the priority until the priority is determined with at least a threshold level of accuracy;
monitoring the at least one sampled text source for changes in task-related circumstances pertaining to the prioritized action item;
responsive to recognizing a change in task-related circumstances in other electronically rendered text based on the monitoring, as determined by a computer using natural language processing, recomputing the priority assigned to the action item; and
continuing monitoring and recomputing the priority of the action item to generate a dynamically ranked list of action items.

15. The computer program product of claim 14, wherein the operations further include linking an expiry time to the action item based on the priority and, responsive to the change in task-related circumstances, changing the expiry time.

16. The computer program product of claim 14, wherein the prioritizing comprises determining a probability indicating a likelihood that a user will act upon the action item within a specified timeframe.

17. The computer program product of claim 14, wherein the prioritizing comprises determining an importance of the action item corresponding to the user-related task based on the importance of the user-related task to a party for whom the user-related task is performed.

18. The computer program product of claim 14, wherein the prioritizing comprises determining at least one current focus of a user.

19. The computer program product of claim 18, wherein the determining at least one current focus of the user comprises identifying a geographical location of the user.

20. The computer program product of claim 14, wherein the database of predetermined priority factors comprises at least one parameter selected from a group consisting of a number of people assigned to a task, a task-specific skill level, and an organizational hierarchy.

* * * * *